(12) United States Patent  (10) Patent No.: US 8,792,015 B2
Hatakeyama  (45) Date of Patent: Jul. 29, 2014

(54) IMAGE PROCESSING APPARATUS, IMAGE PROCESSING METHOD, IMAGE PICKUP APPARATUS, AND A NON-TRANSITORY COMPUTER-READABLE STORAGE MEDIUM

(75) Inventor: Koshi Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 177 days.

(21) Appl. No.: 13/568,472

(22) Filed: Aug. 7, 2012

(65) Prior Publication Data

US 2013/0038748 A1 Feb. 14, 2013

(30) Foreign Application Priority Data

Aug. 8, 2011 (JP) .................................. 2011-172480

(51) Int. Cl.
*H04N 5/228* (2006.01)
*G06K 9/36* (2006.01)
*G06K 9/40* (2006.01)

(52) U.S. Cl.
USPC .................... 348/222.1; 382/254; 382/280

(58) Field of Classification Search
USPC ............... 348/222.1; 382/254–255, 260–262, 382/265, 276, 280
See application file for complete search history.

(56) References Cited

U.S. PATENT DOCUMENTS

| 6,697,522 | B1* | 2/2004 | Ishikawa | 382/167 |
| 7,627,193 | B2 | 12/2009 | Alon et al. | |
| 8,300,121 | B2* | 10/2012 | Yahata | 348/241 |
| 2004/0150732 | A1 | 8/2004 | Yamanaka | |
| 2006/0239549 | A1* | 10/2006 | Kelly et al. | 382/167 |
| 2007/0116375 | A1* | 5/2007 | Utsugi et al. | 382/264 |
| 2007/0126892 | A1* | 6/2007 | Guan | 348/240.99 |
| 2007/0146689 | A1* | 6/2007 | Araki et al. | 356/124.5 |
| 2008/0007797 | A1* | 1/2008 | Hayashi et al. | 358/474 |
| 2008/0043126 | A1* | 2/2008 | Hayashi | 348/294 |
| 2008/0080019 | A1* | 4/2008 | Hayashi et al. | 358/474 |
| 2009/0322928 | A1* | 12/2009 | Robinson et al. | 348/340 |
| 2010/0079626 | A1* | 4/2010 | Hatakeyama | 348/241 |
| 2011/0135216 | A1 | 6/2011 | Hatakeyama | |

FOREIGN PATENT DOCUMENTS

| JP | 2002-199203 A | 7/2002 |
| JP | 2005-063323 A | 3/2005 |
| JP | 2007-183842 A | 7/2007 |
| JP | 2010-087672 A | 4/2010 |
| JP | 2011-010214 A | 1/2011 |

OTHER PUBLICATIONS

JP OA issued Jul. 23, 2013 for corres. JP 2011-172503.
Extended European Search Report for EP 12179464.8, dated Sep. 18, 2013.

* cited by examiner

*Primary Examiner* — Kelly L Jerabek
(74) *Attorney, Agent, or Firm* — Rossi, Kimms & McDowell LLP

(57) ABSTRACT

An image processing apparatus that performs an image restoration processing of an image includes an optical transfer function obtaining portion configured to obtain an optical transfer function depending on an image pickup condition of the image, a threshold frequency obtaining portion configured to obtain a threshold frequency at which an absolute value of the optical transfer function is under a predetermined threshold value, a generating portion configured to generate an image restoration filter that has gain characteristics depending on the threshold frequency using the optical transfer function, and a processing portion configured to perform the image restoration processing of the image using the image restoration filter.

10 Claims, 6 Drawing Sheets

IMAGE PROCESSING APPARATUS, IMAGE PROCESSING METHOD, IMAGE PICKUP APPARATUS, AND A NON-TRANSITORY COMPUTER-READABLE STORAGE MEDIUM

BACKGROUND OF THE INVENTION

1. Field of the Invention

The present invention relates to an image processing method that performs an image restoration processing of an image.

2. Description of the Related Art

An image (a taken image) that is obtained by an image pickup apparatus contains a blur component of an image caused by each aberration such as spherical aberration, coma aberration, distortion, or astigmatism of an image pickup optical system, and therefore it is deteriorated. The blur component of the image caused by such aberrations means that a light beam emitted from one point of an object is actually spread although it should be ideally collected on one point on an imaging plane again when any aberration does not exist and also any influence by diffractions does not exist, which is represented by point spread function (PSF).

The optical transfer function (OTF) that is obtained by performing the Fourier transform is frequency component information of the aberration, and it is represented by a complex number. An absolute value of the optical transfer function OTF, i.e. amplitude component is referred to as an MTF (Modulation Transfer Function), and a phase component is referred to as a PTF (Phase Transfer Function). The amplitude component MTF and the phase component PTF are frequency characteristics of an amplitude component and a phase component of the image deterioration caused by the aberration, respectively, and the phase component is represented as a phase angle by the following expression.

$$PTF = \tan^{-1}(Im(OTF)/Re(OTF))$$

In the expression, Re(OTF) and Im(OTF) indicate a real part and an imaginary part of the optical transfer function OTF, respectively. Thus, the optical transfer function OTF of the image pickup optical system deteriorates the amplitude component MTF and the phase component PTF of the image, and therefore the deteriorated image is in a state where each point of the object is asymmetrically blurred as it has the coma aberration. Chromatic aberration of magnification is generated because an imaging position is shifted by the difference of an imaging magnification for each light wavelength and it is obtained as color components of for example RGB in accordance with the spectroscopic characteristics of an image pickup apparatus.

As a method of correcting the deteriorations of the amplitude component MTF and the phase component PTF, a method of performing the correction using information of the optical transfer function OTF of the image pickup optical system is known. This method is called an image restoration or an image recovery, and hereinafter, a processing of correcting the deterioration of the image using the information of the optical transfer function (OTF) of the image pickup optical system is referred to as an image restoration processing. As described below in detail, as one of methods of the image restoration, a method of convoluting an image restoration filter that has inverse characteristics of the optical transfer function (OTF) with an input image is known.

In order to effectively perform the image restoration processing, the optical transfer function OTF of the image pickup optical system needs to be precisely obtained. As a method of obtaining the optical transfer function OTF, for example it can be obtained by the calculation based on design value information of the image pickup optical system if the information is provided. Alternatively, it can also be obtained by taking an image of a point light source to perform the Fourier transform for its intensity distribution.

The optical transfer function OTF of the image pickup optical system generally varies in accordance with an image height (a position of an image). Therefore, in order to perform the image restoration processing of the image with high accuracy, an appropriate image restoration filter that is generated based on the variation of the optical transfer function OTF for each image height needs to be used. When characteristics of the image restoration is changed in accordance with the position of the image, it is preferred that the image restoration processing be performed while the image restoration filter is switched in a real space instead of being performed collectively in a frequency space. Japanese Patent Laid-Open No. 2007-183842 discloses a configuration in which an adjustment parameter to adjust a restoration degree of a restored image is provided to continuously change the restoration degree of the restored image.

However, in accordance with the image pickup condition, for at least a part of the image, there is a case where an amplitude component MTF of the optical transfer function becomes zero in a range of Nyquist frequency of an image pickup element. Hereinafter, this is referred to as degradation, and a frequency at which the degradation occurs is referred to as a degradation frequency. As a reason of the degradation, there is an aberration, diffraction, a hand-shake, or the like. Since information related to the degradation frequency are not transferred (not taken), the image restoration processing cannot be performed at the degradation frequency. In addition, when the image restoration processing is performed only at frequencies other than the degradation frequency, ringing is generated at an edge portion of the image. As a result, a high-quality restored image cannot be obtained.

In the configuration of Japanese Patent Laid-Open No. 2007-183842, the adjustment of the restoration degree is possible. However, the configuration of Japanese Patent Laid-Open No. 2007-183842 enables a user to only change the restoration degree, and an appropriate parameter depending on frequency characteristics of an optical system (the optical transfer function) is not automatically determined. Furthermore, since it does not adjust the restoration degree in accordance with the degradation frequency, a difference image caused by the optical system in which the degradation exists cannot be appropriately restored.

SUMMARY OF THE INVENTION

The present invention provides an image processing apparatus that is capable of performing an appropriate image restoration processing, an image processing method, an image pickup apparatus, and a non-transitory computer-readable storage medium.

An image processing apparatus as one aspect of the present invention performs an image restoration processing of an image, and the image processing apparatus includes an optical transfer function obtaining portion configured to obtain an optical transfer function depending on an image pickup condition of the image, a threshold frequency obtaining portion configured to obtain a threshold frequency at which an absolute value of the optical transfer function is under a predetermined threshold value, a generating portion configured to generate an image restoration filter that has gain characteristics depending on the threshold frequency using the optical transfer function, and a processing portion configured to perform the image restoration processing of the image using the image restoration filter.

An image processing method as another aspect of the present invention performs an image restoration processing of an image, and the image processing method comprising the steps of obtaining an optical transfer function depending on an image pickup condition of the image, and performing the image restoration processing of the image using an image restoration filter that is generated using the optical transfer function and that has gain characteristics depending on a threshold frequency at which an absolute value of the optical transfer function is under a predetermined threshold value.

An image pickup apparatus as another aspect of the present invention performs an image restoration processing of an image, and the image pickup apparatus includes an image pickup optical system, an image pickup element configured to perform a photoelectric conversion of an object image obtained via the image pickup optical system to generate the image, an optical transfer function obtaining portion configured to obtain an optical transfer function depending on an image pickup condition of the image, a threshold frequency obtaining portion configured to obtain a threshold frequency at which an absolute value of the optical transfer function is under a predetermined threshold value, a generating portion configured to generate an image restoration filter that has gain characteristics depending on the threshold frequency using the optical transfer function, and a processing portion configured to perform the image restoration processing of the image using the image restoration filter.

A non-transitory computer-readable storage medium storing a process for causing an information processing apparatus to execute a method, and the method includes obtaining a threshold frequency at which an absolute value of the optical transfer function is under a predetermined threshold value, generating an image restoration filter that has gain characteristics depending on the threshold frequency using the optical transfer function, and performing the image restoration processing of the image using the image restoration filter.

Further features and aspects of the present invention will become apparent from the following description of exemplary embodiments with reference to the attached drawings.

DESCRIPTION OF THE PREFERRED EMBODIMENTS

Figure 1:
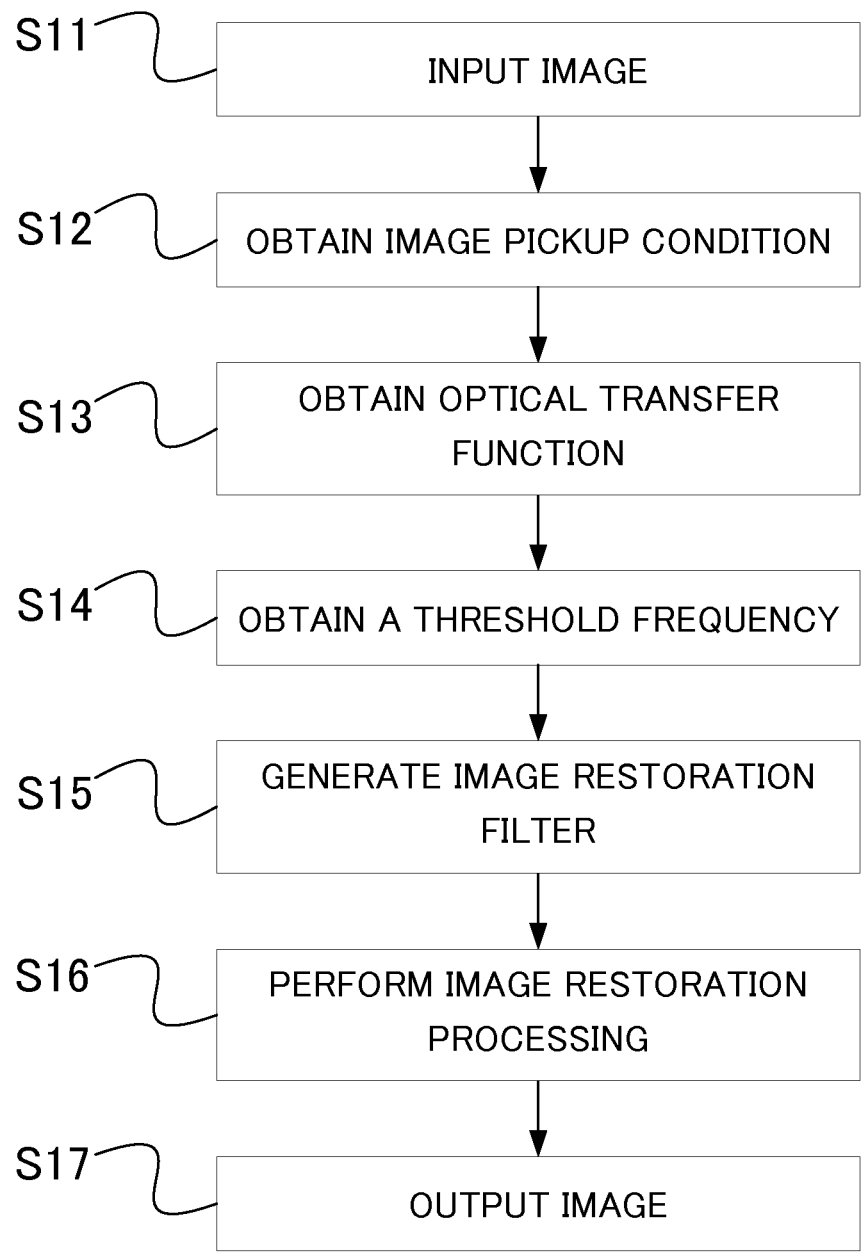
FIG. 1 is a flowchart of an image processing method in Embodiment 1.

Exemplary embodiments of the present invention will be described below with reference to the accompanied drawings. In each of the drawings, the same elements will be denoted by the same reference numerals and the duplicate descriptions thereof will be omitted.

First of all, definitions of terms that are described in the present embodiment and an image restoration processing (an image processing method) will be described. The image processing method described here is appropriately used in each of the following embodiments.

[Input Image]

An input image is a digital image (an image, or a taken image) that is obtained by receiving light on an image pickup element via an image pickup optical system, which is deteriorated in accordance with an optical transfer function OTF due to an aberration of the image pickup optical system that includes a lens and various kinds of optical filter. The image pickup optical system can also be configured by using a mirror (a reflection surface) that has a curvature, as well as a lens.

A color component of the input image, for example, has information of RGB color components. As a color component, in addition to that, a color space that is commonly used such as brightness, color phase, and chroma represented by LCH, luminance represented by YCbCr, or a color-difference signal can also be selectively used. As another color space, XYZ, Lab, Yuv, and JCh can also be used. Furthermore, a color temperature may also be used.

An image pickup condition such as a focal length of a lens, an aperture value (F-number), or an object distance or various kinds of correction information to correct this image can be added to the input image or an output image. When the image is transferred from an image pickup apparatus to an image processing apparatus that is separated from the image pickup apparatus to perform a correction processing, it is preferred that the image pickup condition or the information related to the correction be added to the image as described above. As another method of transferring the image pickup condition or the information related to the correction, the image pickup apparatus and the image processing apparatus may also be directly or indirectly connected with each other to transfer it between them.

[Image Restoration Processing]

Subsequently, an outline of the image restoration processing will be described. When the image (the taken image, or the deteriorated image) is denoted by g(x,y), an original image is denoted by f(x,y), and a point spread function PSF that is a Fourier pair of the optical transfer function OTF is denoted by h(x,y), the following Expression (1) is met.

$$g(x,y)=h(x,y)*f(x,y) \qquad (1)$$

In Expression (1), symbol * denotes a convolution (a product sum), and symbol (x,y) denotes a coordinate on the image.

When the Fourier transform is performed for Expression (1) to be transformed to a display format on a frequency plane, Expression (2) that is represented as a product for each frequency is obtained.

$$G(u,v)=H(u,v)\cdot F(u,v) \quad (2)$$

In Expression (2), symbol H denotes an optical transfer function OTF that is obtained by performing the Fourier transform for the point spread function PSF(h), and symbols G and F denote functions that are obtained by performing the Fourier transform for the deteriorated image g and the original image f, respectively. Symbol (u,v) denotes a coordinate on a two-dimensional frequency plane, i.e. a frequency.

In order to obtain the original image f from the image, i.e. the deteriorated image g, as represented by the following Expression (3), both sides may be divided by the optical transfer function h.

$$G(u,v)/H(u,v)=F(u,v) \quad (3)$$

Then, the inverse Fourier transform is performed for F(u, v), i.e. G(u,v)/H(u,v), to be restored on a real plane to obtain the original image f(x,y) as a restored image.

When symbol R denotes a value that is obtained by performing the inverse Fourier transform for $H^{-1}$, the original image f(x,y) can be similarly obtained by the convolution processing for the image on the real plane as represented by the following Expression (4).

$$g(x,y)*R(x,y)=f(x,y) \quad (4)$$

In Expression (4), symbol R(x,y) is called an image restoration filter. When the image is a two-dimensional image, commonly, the image restoration filter R is also a two-dimensional filter that has taps (cells) corresponding to each of pixels of the image. Generally, as the number of the taps (the number of the cells) of the image restoration filter R is large, the restoration accuracy is improved. Therefore, the number of the taps that can be realized is set in accordance with characteristics such as a required image quality, an image processing capability, or an aberration. Since the image restoration filter R at least needs to reflect the characteristics of the aberration, it is different from a conventional edge enhancement filter (a high-pass filter) that has around three taps horizontally and vertically. Since the image restoration filter R is set based on the optical transfer function OTF, both the deteriorations of an amplitude component and a phase component can be corrected with high accuracy.

Since a real image contains a noise component, the noise component is significantly amplified as the deteriorated image is restored when the image restoration filter R that is generated by using the complete inverse of the optical transfer function OTF is used. This is because MTF is held up so as to restore the MTF (the amplitude component) of the optical system to 1 over an entire frequency for a state where amplitude of the noise is added to the amplitude component of the image. Although the MTF that is amplitude deterioration caused by the optical system is restored to 1, at the same time, a power spectrum of the noise is also held up, and as a result, the noise is amplified in accordance with the degree (a restoration gain) to hold up the MTF.

Therefore, when the noise is contained, an appropriate image as an ornamental image cannot be obtained. This is represented by the following Expressions (5-1) and (5-2).

$$G(u,v)=H(u,v)\cdot F(u,v)+N(u,v) \quad (5\text{-}1)$$

$$G(u,v)/H(u,v)=F(u,v)+N(u,v)/H(u,v) \quad (5\text{-}2)$$

In Expressions (5-1) and (5-2), symbol N denotes a noise component.

With regard to the image that contains the noise component, for example as Wiener filter represented by the following Expression (6), there is a method of controlling the restoration degree in accordance with an intensity ratio SNR of an image signal and a noise signal.

$$M(u,v) = \frac{1}{H(u,v)} \frac{|H(u,v)|^2}{|H(u,v)|^2 + SNR^2} \quad (6)$$

In Expression (6), symbol M(u,v) is frequency characteristics of the Wiener filter, and symbol |H(u,v)| is an absolute value (the amplitude component MTF) of the optical transfer function OTF. In this method, for each frequency, the restoration gain (the restoration degree) is reduced as the MTF is small, and the restoration gain is increased as the MTF is large. Commonly, since the MTF of the image pickup optical system is high at a low frequency side and is low at a high frequency side, this method substantially reduces the restoration gain at the high frequency side of the image.

Figure 2:
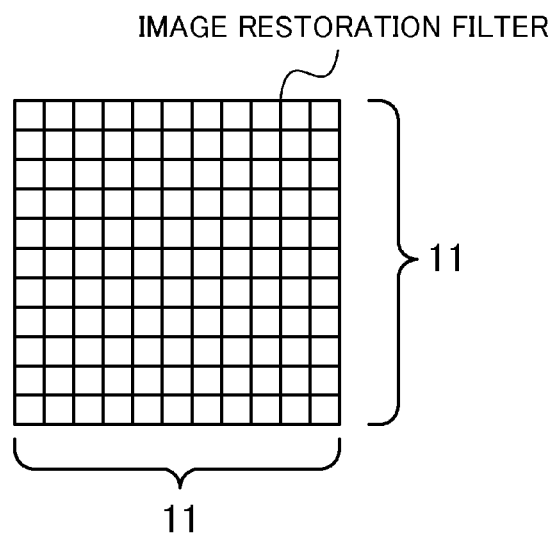
FIG. 2 is a diagram of describing an image restoration filter that is used in the image processing method in each of the embodiments.
Figure 3:
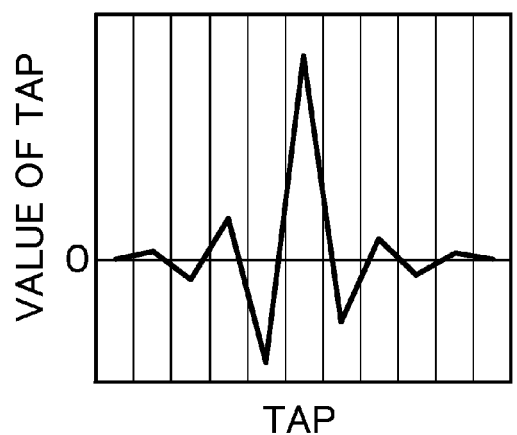
FIG. 3 is a diagram of describing an image restoration filter that is used in the image processing method in each of the embodiments.

Subsequently, referring to FIGS. 2 and 3, the image restoration filter will be described. In the image restoration filter, the tap number is determined in accordance with the aberration characteristics of the image pickup optical system or the required restoration accuracy. The image restoration filter in FIG. 2 is a two-dimensional filter having 11×11 taps as one example. In FIG. 2, a value (a coefficient) in each tap is omitted, and one cross section of this image restoration filter is illustrated in FIG. 3. A distribution of the value (the coefficient value) of each tap of the image restoration filter has a function that restores a signal value (PSF) that is spatially spread by the aberration to one original point ideally.

The convolution processing (the product sum) is performed for each tap of the image restoration filter in a step of the image restoration processing with respect to each pixel of the image. In the convolution processing, in order to improve a signal value of a predetermined pixel, the pixel matches a center of the image restoration filter. Then, a product of the signal value of the image and the coefficient value of the filter is obtained for each image and each corresponding pixel of the image restoration filter, and the total sum is replaced as a signal value of the center pixel.

Figures 4A, 4B:
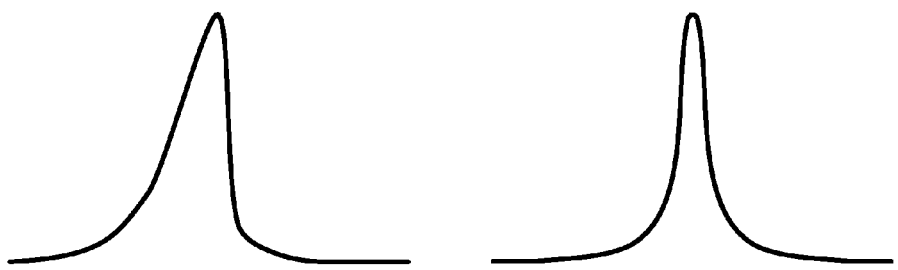
FIGS. 4A and 4B are diagrams of describing a correction state of a point image of the image processing method in each of the embodiments.
Figure 5A:
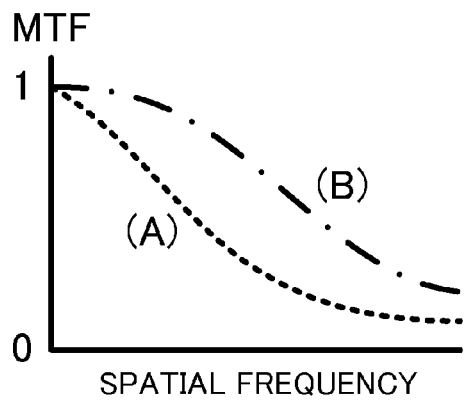
FIGS. 5A and 5B are diagrams of describing an amplitude component and a phase component of an optical transfer function in each of the embodiments.
Figure 5B:
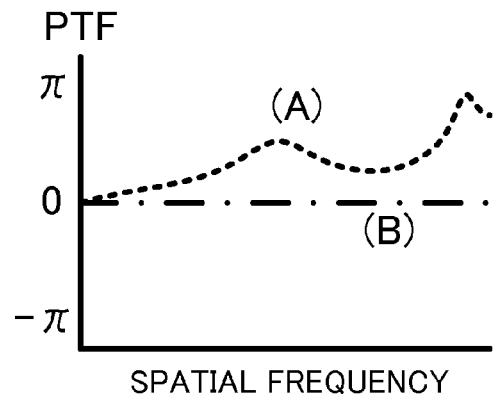

Subsequently, referring to FIGS. 4A, 4B, 5A, and 5B, characteristics in a real space and a frequency space of the image restoration will be described. FIGS. 4A and 4B are diagrams of describing the point spread function PSF, and FIG. 4A illustrates the point spread function PSF before the image restoration is performed and FIG. 4B illustrates the point spread function PSF after the image restoration is performed. FIGS. 5A and 5B are diagrams of describing an amplitude component MTF and a phase component PTF of the optical transfer function OTF. A dashed line (A) in FIG. 5A illustrates the MTF before the image restoration is performed, and a dashed-dotted line (B) illustrates the MTF after the image restoration is performed. A dashed line (A) in FIG. 5B illustrates the PTF before the image restoration is performed, and a dashed-dotted line (B) illustrates the PTF after the image restoration is performed. As illustrated in FIG. 4A, the point spread function PSF before the image restoration has an asymmetric spread, and the phase component PTF has a non-linear value with respect to the frequency due to this asymmetry. Since the image restoration processing amplifies the amplitude component MTF and performs a correction so that the phase component PTF becomes zero, the point spread function PSF after the image restoration has a symmetric and sharp-pointed shape.

Thus, the image restoration filter can be obtained by the inverse Fourier transform for the function that is designed based on the inverse function of the optical transfer function OTF of the image pickup optical system. The image restoration filter that is used in the present embodiment can be changed if necessary, and for example the Wiener filter as described above can be used. When the Wiener filter is used, the image restoration filter in a real space where an image is really convoluted can be generated by performing the inverse Fourier transform for Expression (6). The optical transfer function OTF is changed in accordance with an image height of the image pickup optical system (a position of the image) even in one image pickup state. Therefore, the image restoration filter is used by changing in accordance with the image height.

Embodiment 1

Next, referring to FIG. 1, an image processing method in Embodiment 1 of the present invention will be described. FIG. 1 is a flowchart of the image processing method (an image processing program) in the present embodiment. The flowchart of FIG. 1 is performed based on an instruction of an image processing apparatus described below.

First of all, in Step S11, an image (a taken image) is obtained as an input image. The image can be obtained by connecting an image pickup apparatus with an image processing apparatus by wired or wireless connections. The image can also be obtained via a storage medium. Subsequently, in Step S12, an image pickup condition of the image is obtained. Step S12 is performed by an image pickup condition obtaining portion of the image processing apparatus. The image pickup condition includes a focal length, an aperture value (an F-number), an object distance, and the like. When the image pickup apparatus is configured so that a lens is interchangeably mounted on a camera, the image pickup condition further includes a lens ID or a camera ID. Information related to the image pickup condition can be directly obtained from the image pickup apparatus. Alternatively, this information can also be obtained from information added to an image.

Next, in Step S13, an optical transfer function OTF depending on the image pickup condition is obtained. Step S13 is performed by an optical transfer function obtaining portion of the image processing apparatus. This optical transfer function OTF is an optical transfer function OTF that is suitable for the image pickup condition, which can be selected from a plurality of optical transfer functions OTF previously stored. Alternatively, a function for generating the optical transfer function OTF and a coefficient group used for generating it can be previously stored to newly generate the optical transfer function OTF suitable for the image pickup condition in this step. Furthermore, when the image pickup condition such as the aperture value, the object distance, and the focal length of the zoom lens is a specific image pickup condition, it can also be generated by an interpolation processing based on the optical transfer function OTF corresponding to the image pickup conditions previously stored. In this case, an amount of data of the image restoration filter to be stored can be reduced. As an interpolation processing, for example a bilinear interpolation (a linear interpolation), a bicubic interpolation or the like is used, but the present embodiment is not limited to this.

Subsequently, in Step S14, a threshold frequency at which the absolute value (the amplitude component MTF) of the optical transfer function OTF of the image pickup optical system is under a predetermined threshold value is obtained. Step S14 is performed by a threshold frequency obtaining portion of the image processing apparatus. The threshold frequency can be detected during taking an image, but the embodiment is not limited to this, and for example it can also be obtained based on an F-number during taking the image. The details of the threshold frequency will be described below.

Subsequently, in Step S15, an image restoration filter that has gain characteristics depending on the threshold frequency is generated using the optical transfer function OTF of the image pickup optical system. Step S15 is performed by a generating portion of the image processing apparatus. The image restoration filter generated in Step S15 is an image restoration filter that is obtained considering characteristics of the optical transfer function OTF in view of the threshold frequency. The details of the generation of the image restoration filter will be described below. In the embodiment, alternatively, a second optical transfer function OTF that has gain characteristics depending on the threshold frequency may be generated based on the optical transfer function OTF of the image pickup optical system to generate the image restoration filter based on the second optical transfer function OTF. The image restoration filter generated in this way is also the image restoration filter that has the gain characteristics depending on the threshold frequency.

Subsequently, in Step S16, an image restoration processing of the image is performed using the image restoration filter generated in Step S15. In other words, the convolution of the image restoration filter is performed for the image to perform the image restoration processing of the image. Step S16 is performed by a processing portion of the image processing apparatus. Then, in Step S17, a restored image (an output image) is outputted based on a result of the image restoration processing in Step S16, and the flow of FIG. 1 is finished.

Figure 6A:
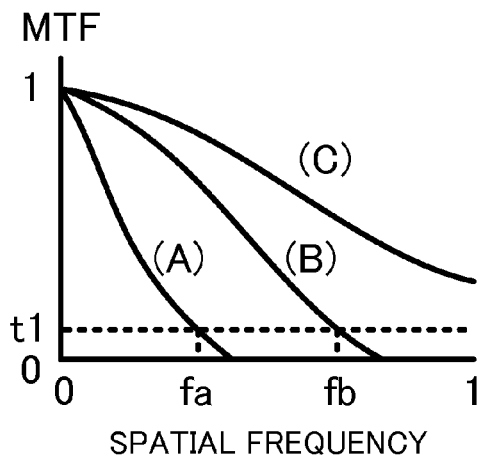
FIGS. 6A and 6B are diagrams of describing a threshold frequency in Embodiment 1.
Figure 6B:
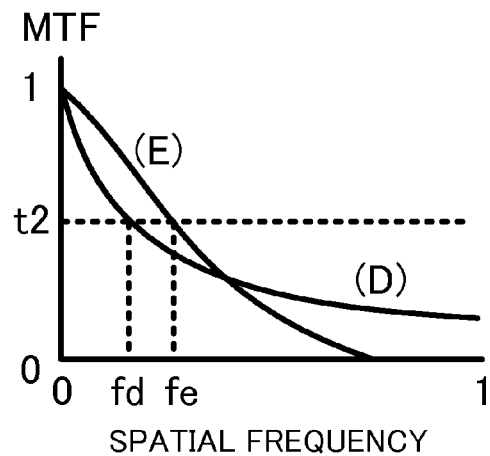

Next, referring to FIGS. 6A and 6B, a method of obtaining the threshold frequency in Step S14 of FIG. 1 will be described in detail. FIGS. 6A and 6B are diagrams of describing the threshold frequency in the present embodiment, which illustrate the relationship between the amplitude component MTF (the absolute value) of the optical transfer function and the spatial frequency (frequency characteristics). In the drawings, 1 on a lateral axis (the spatial frequency) is normalized to be Nyquist frequency that is determined by a pixel pitch of the image pickup element.

FIG. 6A illustrates amplitude components MTF of optical transfer functions that have three frequency characteristics (A), (B), and (C) different from each other. In FIG. 6A, frequencies fa and fb at which the amplitude components MTF indicate a threshold value t1 in the frequency characteristics (A) and (B) respectively are set as threshold frequencies. With respect to the frequency characteristic (C), a frequency at which the amplitude component MTF indicates a value under the threshold value t1 (the threshold frequency) does not exist. On the other hand, FIG. 6B illustrates amplitude components MTF of optical transfer functions that have two different frequency characteristics (D) and (E). In FIG. 6B, frequencies fd and fe at which the amplitude components MTF indicate a threshold value t2 in the frequency characteristics (D) and (E) respectively are set as threshold frequencies.

Thus, a predetermined threshold value t (t1, t2) of the amplitude component MTF of the optical transfer function can be set to an appropriate value in accordance with a purpose. For example, when the threshold frequency is obtained as a degradation frequency, the spatial frequency which is indicated on conditions that the amplitude component MTF indicates zero (t=0) may be set to the threshold frequency.

However, practically, it can be treated as a sufficiently small value even when the amplitude component MTF is not zero. In this case, for example the spatial frequency on conditions of t=0.03 (the MTF is 3%) can be set as the threshold frequency. In FIG. 6B, the spatial frequency on conditions of t=0.50 (the MTF is 50%) is set as the threshold frequency. In this case, it has a nuance of estimating a basic performance instead of obtaining the degradation frequency. In addition, if the amplitude component MTF is undulate near zero, for example a spurious resolution is contained, there are a plurality of frequencies at which t=0 is met. In the present embodiment, it is preferred that the lowest frequency of the plurality of frequencies (the plurality of frequencies where the amplitude component MTF is under a predetermined threshold value) be set as the threshold frequency.

As a specific method of obtaining the threshold frequency, each of two-dimensional MTF data is compared to a predetermined threshold value, and a frequency is newly stored as a tentative threshold frequency if it is under the predetermined threshold value and also under the tentative threshold frequency. Repeating this, the lowest frequency of the frequencies under the predetermined threshold value can be obtained as the threshold frequency. The two-dimensional MTF data can be generated by obtaining an absolute value of the stored two-dimensional OTF data. As a modified example, adding an azimuth direction to the storage information, the threshold frequency can also be obtained for each azimuth direction. Furthermore, among the MTF data, the threshold frequency can also be obtained as one-dimensional data for a specific azimuth direction. The threshold frequency may be the lowest frequency of the frequencies under the predetermined threshold value for all the azimuth directions, or alternatively it may also be obtained for each of the azimuth directions for more details. The threshold frequency (the degradation frequency) can also be calculated based on a theoretical formula of a diffraction limit using an F-number during taking the image that is obtained in Step S12 of FIG. 1. When the optical transfer function OTF is different in accordance with the azimuth direction, the threshold frequency can also be obtained by a function that has characteristics depending on the azimuth direction or data of a look-up table. Alternatively, among all the azimuth directions, the lowest frequency can also be representatively set as the threshold frequency.

Figure 7:
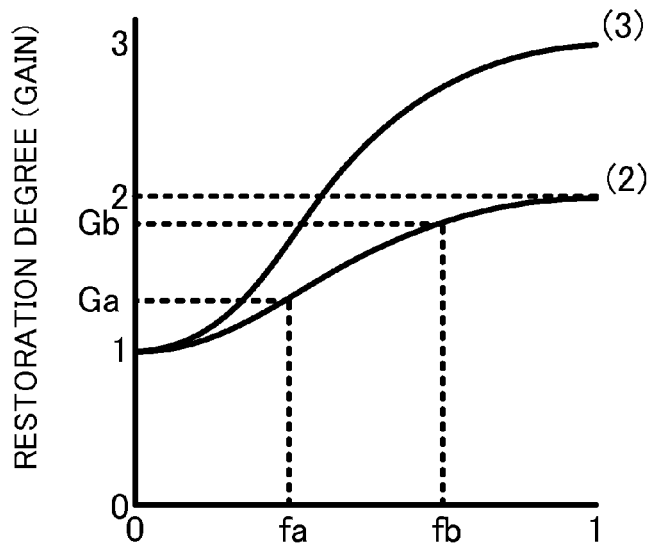
FIG. 7 is a diagram of describing a setting of a restoration degree of the image restoration filter in Embodiment 1.

Next, referring to FIG. 7, the restoration degree of the image restoration filter that is generated in Step S15 of FIG. 1 will be described. As a function to design the image restoration filter, for example Expression (6) described above is used. FIG. 7 is a diagram of describing the setting of the restoration degree (GAIN) of the image restoration filter in the present embodiment, which illustrates a function of determining the restoration degree based on the threshold frequency obtained in Step S14 of FIG. 1. Two curved lines (2) and (3) in FIG. 7 are examples of indicating levels of strength of the basic restoration degree. Such a plurality of levels of strength of the restoration degree are previously stored as preset values in the storage portion. In other words, as illustrated in FIG. 7, information indicating a link between the threshold frequency and the restoration degree are stored in the storage portion. In the embodiment, the preset values may also be arbitrarily set by a user in a predetermined range.

When the curved line (2) in FIG. 7 is applied, with regard to the frequency characteristics (A), (B), and (C) of FIG. 6A as an example, the restoration degrees for the frequency characteristics (A) and (B) are set to restoration degrees Ga and Gb depending on the threshold frequencies fa and fb, respectively. Since the frequency characteristic (C) does not contain the degradation (the threshold frequency does not exist), the restoration degree is set to 2 which is the maximum value of the curved line (2). Similarly, when the curved line (3) is applied, the restoration degree is set to a restoration degree depending on each of the threshold frequencies. Such functions can also be stored in a look-up table. Then, using the term of SNR in Expression (6) as a parameter, the frequency characteristics of the image restoration filter are designed so as to be desired restoration degrees. In the present embodiment, as a value of representing the restoration degree (GAIN) of the image restoration filter, the maximum value (the maximum gain) of the absolute values (the restoration gains) of the frequency characteristics is used.

Figure 8:
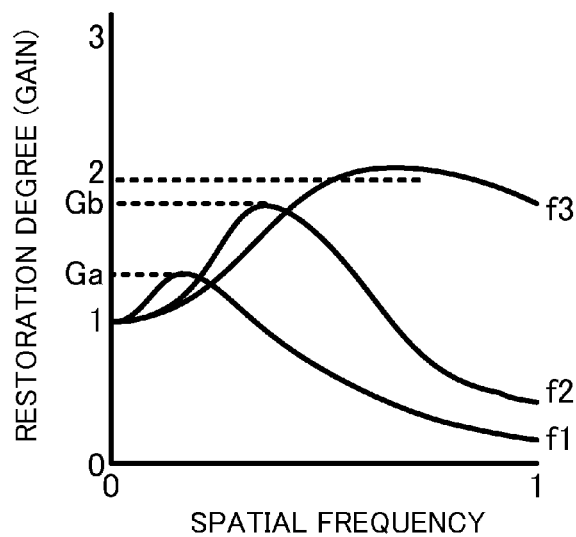
FIG. 8 is a diagram of describing a restoration gain in Embodiment 1.

FIG. 8 is a diagram of describing the restoration gain in the present embodiment, which illustrates gain characteristics f1, f2, and f3 of the image restoration filters that are designed so that the maximum gains are Ga, Gb, and 2, respectively. The gain characteristics are characteristics of indicating the restoration degree for the spatial frequency. FIG. 8 illustrates the gain characteristics of cases to which the curved line (2) in FIG. 7 is applied as an example, and the gain characteristics f1, f2, and f3 correspond to cases in which the threshold frequencies are fa and fb and do not exist, respectively.

As illustrated in FIGS. 7 and 8, comparing the gain characteristics f1 and f2 at the threshold frequencies fa and fb respectively, the maximum gain Ga at the threshold frequency fa is smaller than the maximum gain Gb at the threshold frequency fb. In other words, the gain characteristics of the image restoration filter change so that the maximum gain is reduced as the threshold frequency is lowered.

As illustrated in FIG. 8, comparing the gain characteristics f1 and f2 at the threshold frequencies fa and fb respectively, the gain (the restoration degree) of the gain characteristic f1 is weighted at a lower frequency compared to the gain of the gain characteristic f2. In other words, the gain characteristics of the image restoration filter changes so that the gain of the image restoration filter is weighted at a lower frequency side as the threshold frequency is lowered.

The threshold frequency is different in accordance with a position of the image (the taken image). Therefore, the gain characteristics of the image restoration filter are different in accordance with the position of the image.

Figure 9A:
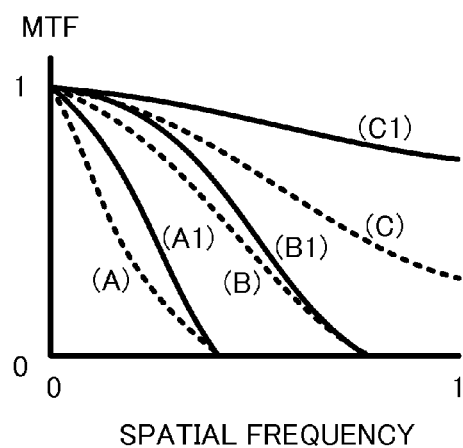
FIGS. 9A and 9B are diagrams of describing amplitude components MTF of the optical transfer functions before and after the image restoration is performed in Embodiment 1.
Figure 9B:
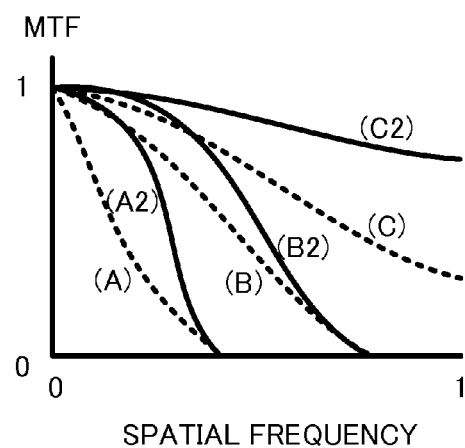

FIGS. 9A and 9B are diagrams of describing the amplitude components MTF of the optical transfer functions before and after the image restoration is performed. FIG. 9A is a result of performing the image restoration processing of the present embodiment for the frequencies (A), (B), and (C) in FIG. 6A. When the image restoration filters that have the gain characteristics f1, f2, and f3 described in FIG. 8 are applied to the frequency characteristics (A), (B), and (C) before the image restoration is performed, they are changed to frequency characteristics (A1), (B1), and (C1) after the image restoration is performed, respectively. On the other hand, FIG. 9B illustrates a result of performing the image restoration processing without considering the frequency characteristics (the threshold frequencies) of the amplitude components MTF of the optical transfer functions. The frequency characteristics (A), (B), and (C) before the image restoration is performed are changed to frequency characteristics (A2), (B2), and (C2) after the image restoration is performed, respectively. In FIG. 9A, since the image restoration processing is performed using the image restoration filter which has appropriate gain characteristics depending on the threshold frequency, the generation of ringing is reduced. On the other hand, in FIG. 9B, the ringing is generated and therefore a high-quality restoration image cannot be obtained.

Furthermore, using a plurality of threshold frequencies at the same time, the frequency characteristics (the gain characteristics) of the optical transfer function can be complexly analyzed by a first threshold frequency and a second threshold frequency. As an example of using the plurality of threshold frequencies, Expression (7) is represented.

$$M(u, v) = \frac{1}{H(u, v)} \frac{|H(u, v)|^2}{|H(u, v)|^2 + SNR^2} C(u, v) \quad (7)$$

Expression (7) is an expression that is obtained by weighting the frequency of C(u,v) for Expression (6). For example, the first threshold frequency is obtained by setting a first threshold value as t=0.03, and the second threshold frequency is obtained by setting a second threshold value as t=0.50. Then, C(u,v) is set so that only the low frequency side is amplified compared to the first threshold frequency and so that an amplification gain is not applied to the degradation frequency, and thus the restoration degree can be determined by setting the maximum gain at the second threshold frequency. In other words, both the weighting of the frequency range of the restoration gain and the restoration degree can be automatically determined based on the two obtained threshold frequencies.

Figure 10:
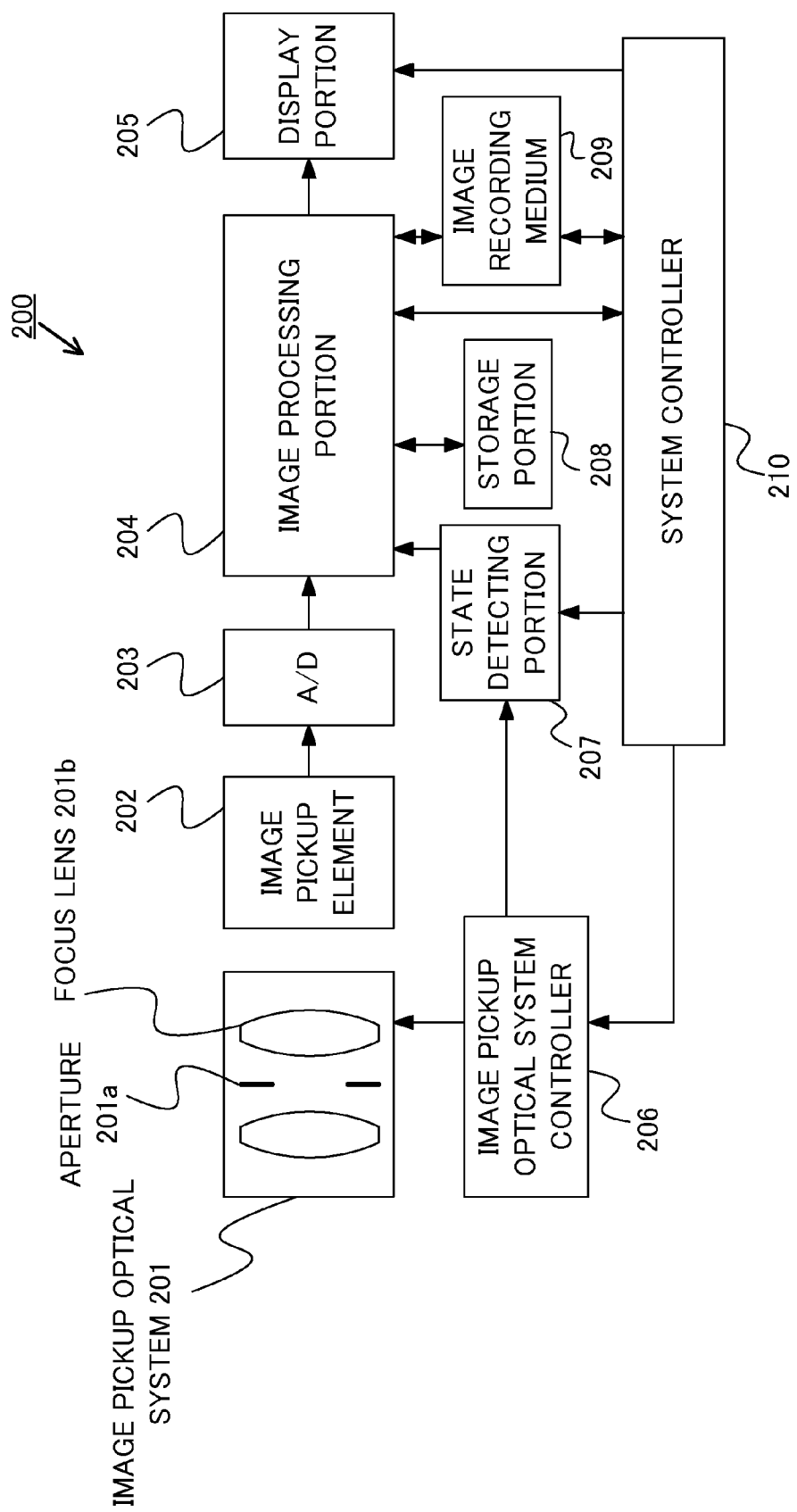
FIG. 10 is a configuration diagram of an image pickup apparatus in Embodiment 1.

Next, referring to FIG. 10, an image pickup apparatus in the present embodiment will be described. FIG. 10 is a configuration diagram of an image pickup apparatus 200 in the present embodiment. An image processing program that performs an image restoration processing of an image (an image processing method described above) is installed in the image pickup apparatus 200, and this image restoration processing is performed by an image processing portion 204 (an image processing apparatus) in the image pickup apparatus 200.

The image pickup apparatus 200 is configured by including an image pickup optical system 201 (a lens) and an image pickup apparatus body (a camera body). The image pickup optical system 201 includes an aperture 201a and a focus lens 201b, which is configured integrally with the image pickup apparatus body (the camera body). However, the present embodiment is not limited to this, and can also be applied to an image pickup apparatus where the image pickup optical system 201 is interchangeably mounted on the image pickup apparatus body.

The image pickup element 202 performs a photoelectric conversion of an object image (imaged light) obtained via the image pickup optical system 201 to generate an image. In other words, the image pickup element 202 performs the photoelectric conversion for the object image to be converted to an analog signal (an electric signal). Then, this analog signal is converted to a digital signal by an A/D converter 203, and this digital signal is inputted to an image processing portion 204.

The image processing portion 204 (the image processing apparatus) performs a predetermined processing for this digital signal and also performs the image restoration processing described above. First of all, the image processing portion 204 (the image pickup condition obtaining portion) obtains image pickup condition information of the image pickup apparatus from a state detecting portion 207. The image pickup condition information means information related to the aperture value, an object distance, a focal length of a zoom lens, or the like. The state detecting portion 207 can directly obtain the image pickup condition information from a system controller 210, but the present embodiment is not limited to this. For example, the image pickup condition information related to the image pickup optical system 201 can also be obtained from an image pickup optical system controller 206. A processing flow of the image restoration processing (an image processing method) of the present embodiment is as described with reference to FIG. 1.

The optical transfer function OTF or the coefficient data necessary to generate the optical transfer function OTF is stored in a storage portion 208. An output image processed by the image processing portion 204 is stored in a predetermined format in an image recording medium 209. An image obtained by performing a predetermined processing for the display for the image where the image restoration processing of the present embodiment has been performed is displayed on a display portion 205. However, the embodiment is not limited to this, and in order to display the image at high speed, an easily processed image may also be displayed on the display portion 205.

Series of the controls in the present embodiment are performed by the system controller 210, and a mechanical drive of the image pickup optical system 201 is performed by the image pickup optical system controller 206 based on an instruction of the system controller 210. The image pickup optical system controller 206 controls a diameter of the aperture 201a as an image pickup condition setting for an F-number. Furthermore, since the image pickup optical system controller 206 performs a focusing operation in accordance with an object distance, it controls a position of the focus lens 201b using an autofocus (AF) mechanism or a manual focus (MF) mechanism (not shown). The function such as a diameter control of the aperture 201a or the manual focus does not need to be performed in accordance with the specification of the image pickup apparatus 200.

An optical element such as a low-pass filter or an infrared cut filter may also be inserted into the image pickup optical system 201, but there is a case in which the consideration is necessary at the time of generating the image restoration filter when an element such as a low-pass filter which influences on characteristics of the optical transfer function (OTF) is used. Furthermore, with regard to the infrared cut filter, there is a case where the consideration is necessary at the time of generating the image restoration filter since it influences on each PSF of RGB channels that is a value of integral of the point spread function (PSF) of a spectroscopic wavelength, particularly the PSF of the R channel.

Embodiment 2

Figure 11:
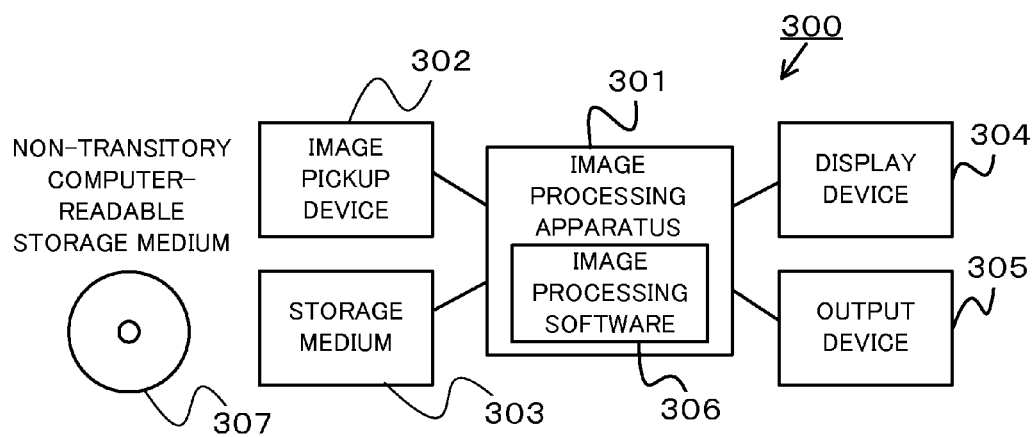
FIG. 11 is a configuration diagram of an image processing system in Embodiment 2.

Next, referring to FIG. 11, an image processing apparatus and an image processing system in Embodiment 2 of the present invention will be described. FIG. 11 is a configuration diagram of an image processing system 300 in the present embodiment. A processing flow of an image restoration processing (an image processing method) of the present embodiment is the same as that of Embodiment 1 described with reference to FIG. 1, and therefore descriptions thereof will be omitted.

In FIG. 11, an image processing apparatus 301 is a computer device in which image processing software 306 that instructs a computer to execute the image processing method of the present embodiment is installed. An image pickup device 302 is an image pickup apparatus such as a camera, a microscope, an endoscope, or a scanner. A storage medium 303 is a storage portion such as a semiconductor memory, a hard disk, or a server on a network that stores an image.

The present embodiment can also be achieved by performing the following processing. In other words, it is a processing in which software (a program) that achieves the function of the embodiments described above is provided to the system or the apparatus via a network or each of various kinds of storage media 307 (non-transitory computer-readable storage media) such as a CD-ROM so that a computer (CPU, MPU, or the like) of the system or the apparatus can read the program to be executed.

The image processing apparatus 301 obtains image data from the image pickup device 302 or the storage medium 303, and outputs image data for which a predetermined image processing has been performed to one or a plurality of an output device 305, the image pickup device 302, or the storage medium 303. The output can also be stored in a storage portion equipped in the image processing apparatus 301. The output device 305 is for example a printer.

A display device 304 that is a monitor is coupled to the image processing apparatus 301. Therefore, a user performs an image processing work via the display device 304, and can also estimate a corrected image. The image processing software 306 performs the image restoration processing (the image processing method) of the present embodiment and also performs a development or other image processings if necessary.

It is preferred that information (correction information) related to contents of data to perform the image processing or the transfer between devices be added to individual image data. When necessary correction information are added to the image data, the correction processing of the present embodiment can be appropriately performed if it is a device that is equipped with the image processing apparatus of the present embodiment.

According to each embodiment described above, since the restoration filter which has an appropriate restoration degree (gain characteristics) can be generated and used considering the characteristics of the optical transfer function in the image pickup condition, influences of ringing or the like can be reduced to obtain a high-quality image. Therefore, according to each embodiment, an image processing apparatus, an image processing method, an image pickup apparatus, and an image processing program that are capable of performing an appropriate image restoration processing can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the threshold frequency may also be a parameter that is associated with a frequency instead of a value of a frequency itself.

This application claims the benefit of Japanese Patent Application No. 2011-172480, filed on Aug. 8, 2011, which is hereby incorporated by reference herein in its entirety.

What is claimed is:

1. An image processing apparatus that performs an image restoration processing of an image, the image processing apparatus comprising:
   an optical transfer function obtaining portion configured to obtain an optical transfer function depending on an image pickup condition of the image;
   a threshold frequency obtaining portion configured to obtain a threshold frequency at which an absolute value of the optical transfer function is under a predetermined threshold value;
   a generating portion configured to generate an image restoration filter that has gain characteristics depending on the threshold frequency using the optical transfer function; and
   a processing portion configured to perform the image restoration processing of the image using the image restoration filter.

2. The image processing apparatus according to claim 1, wherein the threshold frequency is the lowest frequency of frequencies at which the absolute value is under the predetermined threshold value in the optical transfer function.

3. The image processing apparatus according to claim 1, wherein the threshold frequency is detected during taking the image.

4. The image processing apparatus according to claim 1, wherein the threshold frequency is a frequency based on an F-number during taking the image.

5. The image processing apparatus according to claim 1, wherein the gain characteristics of the image restoration filter change so that the maximum gain is reduced as the threshold frequency is lowered.

6. The image processing apparatus according to claim 1, wherein the gain characteristics of the image restoration filter change so that a gain of the image restoration filter is weighted at a lower frequency side as the threshold frequency is lowered.

7. The image processing apparatus according to claim 1,
   wherein the threshold frequency is different in accordance with a position of the image, and
   wherein the gain characteristics of the image restoration filter are different in accordance with the position of the image.

8. An image processing method that performs an image restoration processing of an image, the image processing method comprising the steps of:
   obtaining an optical transfer function depending on an image pickup condition of the image; and
   performing the image restoration processing of the image using an image restoration filter that is generated using the optical transfer function and that has gain characteristics depending on a threshold frequency at which an absolute value of the optical transfer function is under a predetermined threshold value.

9. An image pickup apparatus that performs an image restoration processing of an image, the image pickup apparatus comprising:
   an image pickup optical system;
   an image pickup element configured to perform a photoelectric conversion of an object image obtained via the image pickup optical system to generate the image;
   an optical transfer function obtaining portion configured to obtain an optical transfer function depending on an image pickup condition of the image;
   a threshold frequency obtaining portion configured to obtain a threshold frequency at which an absolute value of the optical transfer function is under a predetermined threshold value;
   a generating portion configured to generate an image restoration filter that has gain characteristics depending on the threshold frequency using the optical transfer function; and
   a processing portion configured to perform the image restoration processing of the image using the image restoration filter.

10. A non-transitory computer-readable storage medium storing a process for causing an information processing apparatus to execute a method, the method comprising:
    obtaining an optical transfer function depending on an image pickup condition of the image;

obtaining a threshold frequency at which an absolute value of the optical transfer function is under a predetermined threshold value;

generating an image restoration filter that has gain characteristics depending on the threshold frequency using the optical transfer function; and performing the image restoration processing of the image using the image restoration filter.

\* \* \* \* \*